United States Patent [19]

Padovani

[11] Patent Number: 4,579,483

[45] Date of Patent: Apr. 1, 1986

[54] MACHINE FOR DRILLING FRAGILE SHEET-LIKE MATERIALS, IN PARTICULAR SHEET GLASS AND THE LIKE

[75] Inventor: Roberto Padovani, Bovisio Masciago, Italy

[73] Assignee: Teax s.r.l., Paderno Dugnano, Italy

[21] Appl. No.: 644,742

[22] Filed: Aug. 27, 1984

[30] Foreign Application Priority Data

Sep. 13, 1983 [IT] Italy .............................. 22872 A/83

[51] Int. Cl.⁴ ............................................ B23B 39/22
[52] U.S. Cl. ...................................... 408/39; 408/61; 408/62; 408/95; 83/732; 51/283 R
[58] Field of Search .......... 83/277, 436, 732, 879–887; 198/786, 787; 271/250, 251; 408/39, 56, 61, 103, 130, 3, 95, 88, 53, 43, 44, 62; 225/98, 99; 29/564, 26 A; 51/283 R, 78

[56] References Cited

U.S. PATENT DOCUMENTS

| | | |
|---|---|---|
| 1,898,005 | 2/1933 | Diescher .......................... 198/786 X |
| 2,437,605 | 3/1948 | Karge ..................................... 408/61 |
| 3,461,615 | 8/1969 | Ferguson ........................... 408/39 X |
| 3,637,063 | 1/1972 | Ward ................................ 198/786 X |
| 3,828,479 | 8/1974 | Highberg et al. ................ 408/39 X |
| 4,280,775 | 7/1981 | Wood ....................................... 408/3 |
| 4,448,099 | 5/1984 | Kuroda et al. ................... 83/277 X |

Primary Examiner—James M. Meister
Assistant Examiner—John L. Knoble
Attorney, Agent, or Firm—Guido Modiano; Albert Josif

[57] ABSTRACT

The machine includes a feed-in station and a drilling station. The feed-in station comprises a carriage for advancing the glass sheets to be drilled. The carriage has a plurality of rollers, at least some of which are driving rollers, the rollers being effective to impart a forward movement to the glass sheet and are provided with a shroud with helical pattern ridges for combining this forward movement with an approaching movement of the glass sheet towards a reference element and an abutment member connected to the frame of the feed-in station and a gripper assembly for carrying said glass sheet towards an adjustable drilling position.

10 Claims, 7 Drawing Figures

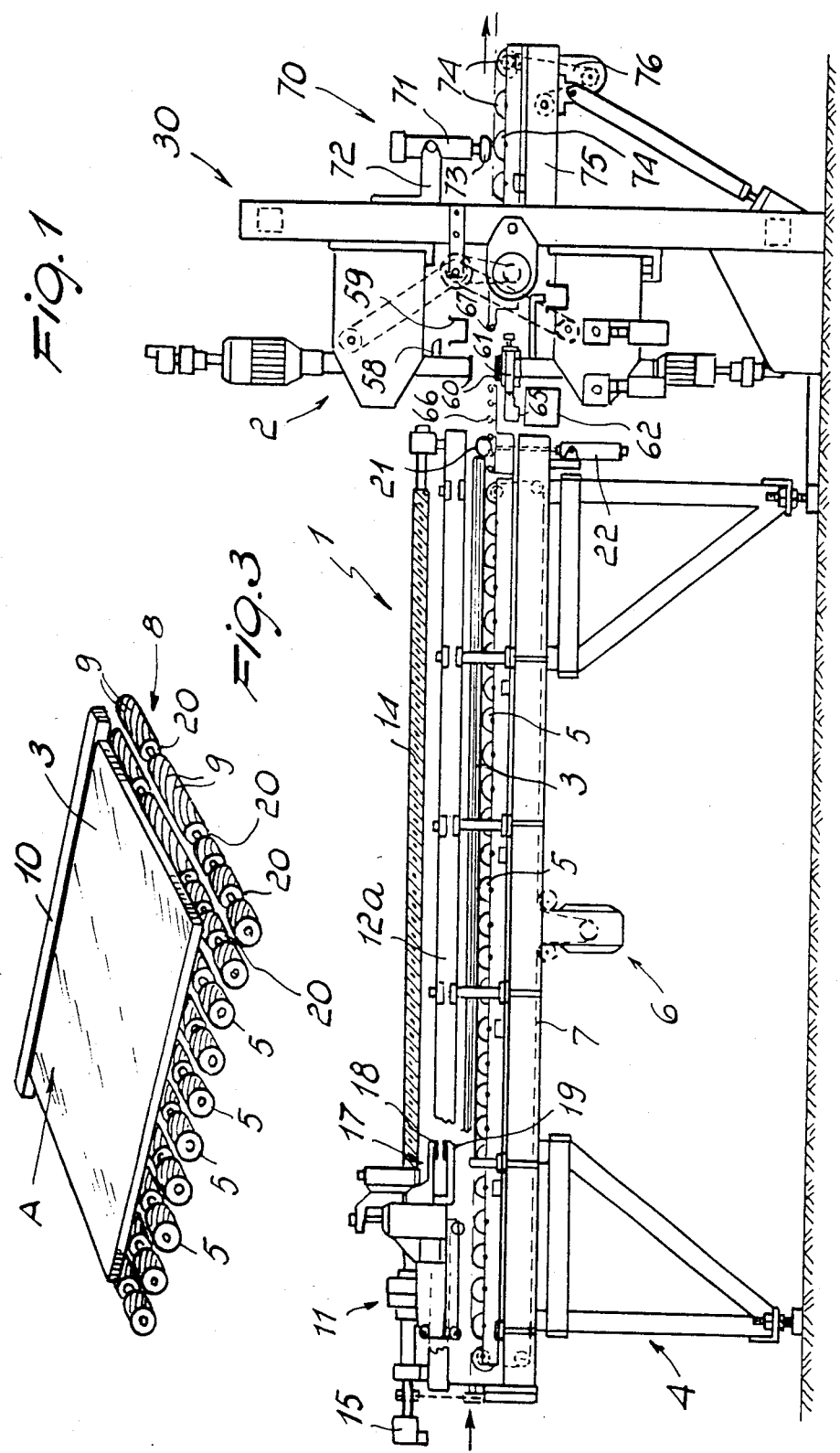

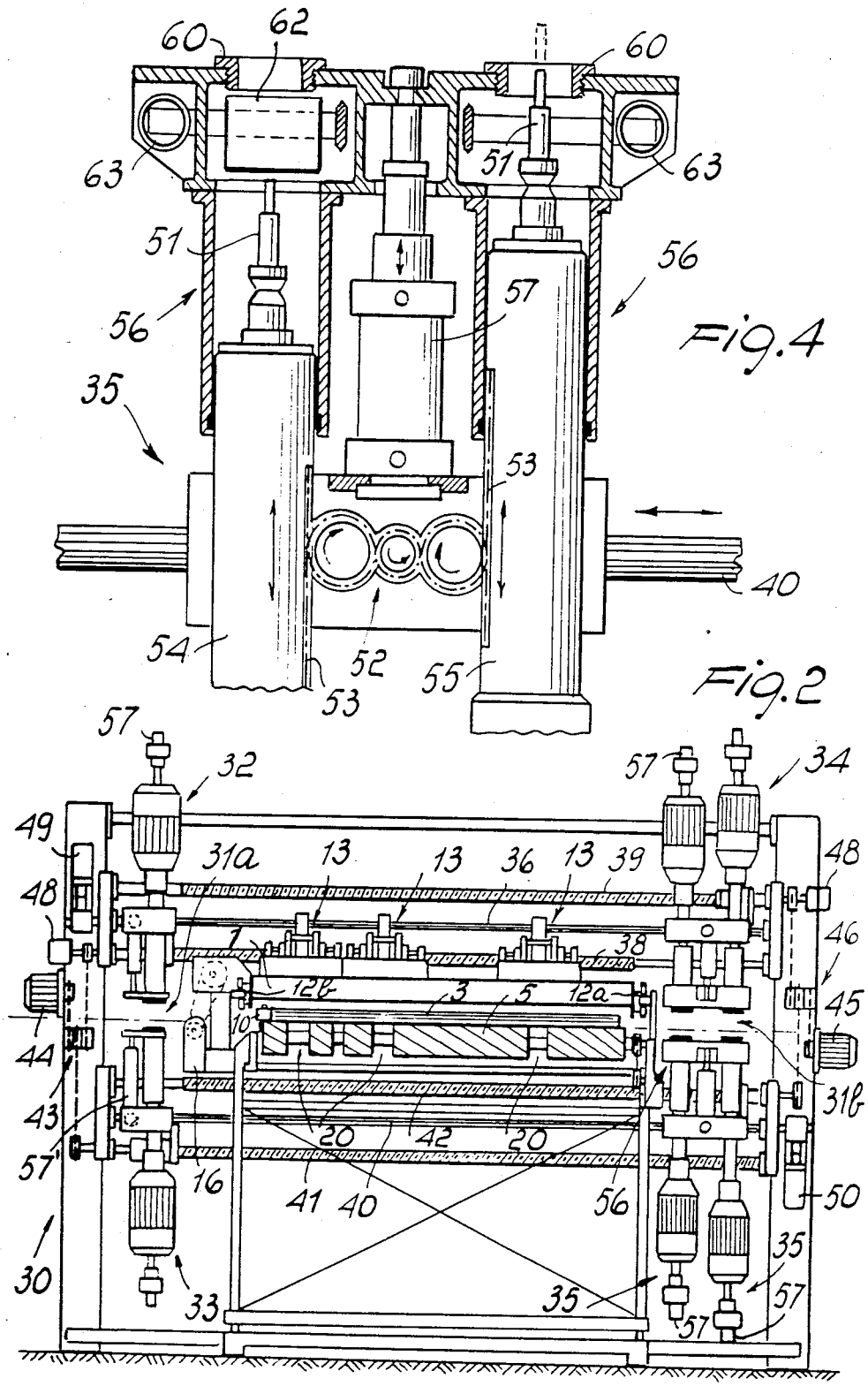

MACHINE FOR DRILLING FRAGILE SHEET-LIKE MATERIALS, IN PARTICULAR SHEET GLASS AND THE LIKE

BACKGROUND OF THE INVENTION

This invention relates to a machine for drilling fragile sheet-like materials, in particular sheet glass and the like.

For drilling holes at preset locations on sheet glass, or comparable materials, it is known to use machines having a locating surface cooperating with one or more drill heads, on which the sheet or plate blank can be moved in a two-dimensional fashion as carried on a plurality of small wheels mounted for rotation about their own axes on pivot pins incorporated to said surface.

A sheet or plate blank is located by means of a set of detents arranged to abut against the peripheral edge of the blank; the detents can be registered in position according to the size of the blank and locations of the holes to be drilled. In general, drill heads of the diamond mill type are utilized which are cooled by a continuous stream of water effective to remove the heat generated by the milling action as well as the glass chips being produced.

Such prior machines have some significant disadvantages, first in connection with the positioning of the blank, which must be carried out manually by skilled personnel, and second, in connection with the working condition of such personnel, exposed to an extremely wet environment where cooling water is normally splashed all around.

This working environment also affects the machine life, and in particular its electric motors, since in severe service conditions, such as are imposed by an environment rich in moisture and glass chips, they are apt to be subjected to a faster wear rate and consequent rapid deterioration thereof.

Accordingly, currently available machines cannot be used with processing lines which require a high degree of mechanization of the operations, and where manual intervention must be restricted to checking operations.

SUMMARY OF THE INVENTION

It is a primary object of this invention to obviate such prior problems by providing a machine for drilling sheet-like materials, and in particular, for drilling hole through sheet glass and the like, which affords complete mechanization of the sheet blank feeding and drilling operations, while improving the overall conditions of the working area where an operator in charge of the machines' control may find himself.

A further object of the invention is to provide a machine as indicated, which can be readily incorporated to processing lines and has provisions for NC operation.

It is another object of the invention to improve the design of a machine as indicated, for drilling sheet-like materials, so as to increase its useful life span, while decreasing wear of its moving parts, improving its performance and its flexibility in relation to sudden job changes.

These and other objects are achieved by a machine for drilling fragile sheet-like materials, in particular sheet glass and the like, of a type comprising a feed-in station for a sheet blank arranged to cooperate with a sheet blank drilling station, said feed-in station including a frame, a means of moving said sheet blank slidingly on said frame, and a position reference means for said sheet blank, said sheet blank drilling station including a frame provided with a holding and locating means for drill units overlying and underlying a working zone and adapted to interact with said sheet blank at said working zone, characterized in that said slide means comprises a plurality of rollers at least some whereof are driven by a motor unit and provided with a means of combining a forward movement of said sheet blank with an approaching movement of said sheet blank toward an abutment member connected to said frame.

BRIEF DESCRIPTION OF THE DRAWINGS

Further features and advantages of the invention will be apparent from the following detailed description of a preferred, but not exclusive, embodiment of this machine for drilling fragile sheet-like materials, to be read in conjunction with the accompanying illustrative drawings, where:

FIG. 1 is a side elevation view showing diagramatically a machine for drilling sheet-like materials according to the invention;

FIG. 2 is a front elevation view of the sheet blank feed-in end of this machine;

FIG. 3 is a perspective detail view of the slide means associated with the feed-in station;

FIG. 4 is a partly sectional detail view of the drill units; and

DESCRIPTION OF THE PREFERRED EMBODIMENTS

Figure 5:
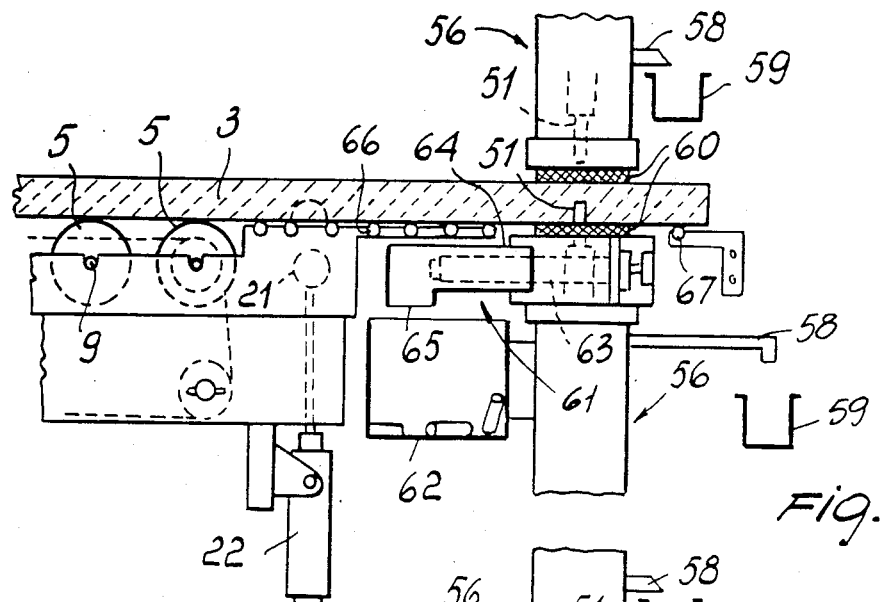
FIGS. 5 to 7 illustrte the operation of the machine of this invention, with particular reference to the working zone of the drill units.
Figure 6:
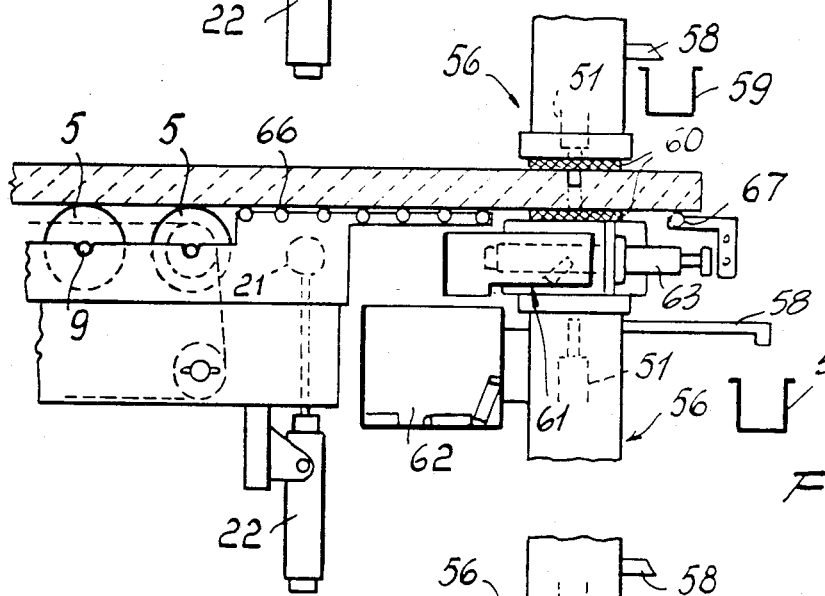
Figure 7:
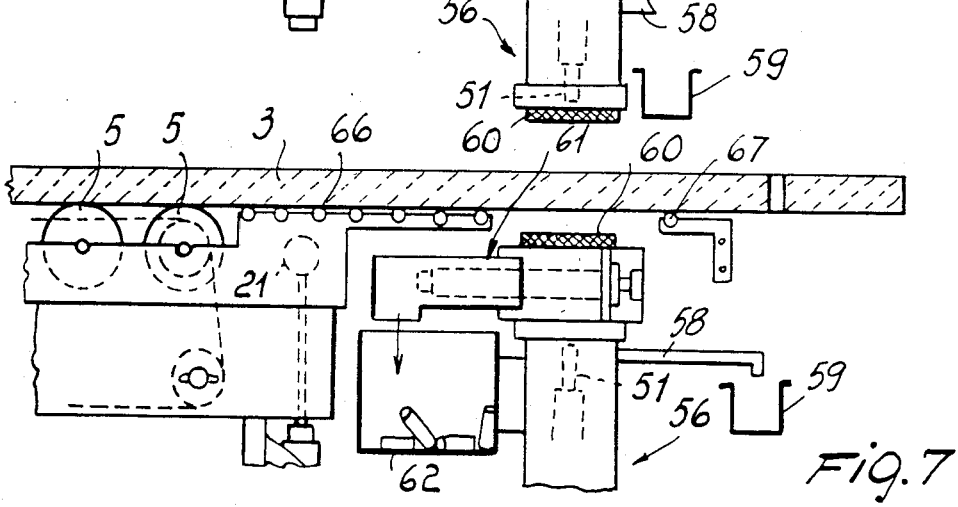

With reference to the drawing views, a machine according to the invention comprises essentially a feed-in station 1 for a sheet-like or plate-like material of the type shown in FIG. 3 and indicated at 3, which station is arranged to cooperte with a drilling station 2 provided in line with the former station.

The feed-in station includes essentially a frame 4 on which a means of slidingly moving the sheet blank 3 are disposed, which comprises a plurality of rollers 5 mounted rotatably on the frame and at least some of which are subjected to the drive from a motor unit 6 through a kinematic transmission means 7.

The rollers form a surface or deck whereon the sheet blank 3 can be advanced, and are preferably laid with their axes crosswise relatively to the sheet blanks' direction of advancement, as indicated by the arrow A in FIG. 3.

They are provided with a peripherally mounted shroud 8 having a plurality of ridges 9 which extend helically around the rotation axis of each roller so that the rotational drive imparted thereto results in a combined motion of the sheet blank toward the drilling station and concurrently closer to an abutment 10 connected to the frame.

Preferably, the ridges are formed from a high frictional coefficient material, such as rubber, plastic resin, and the like; the means for sliding the blank over the frame further comprises a carriage 11 mounted to run along runways 12a and 12b laterally associated with the frame 4 whereon a number of gripper assemblies 13 are placed which provide a gripping action as well as a drive action to advance the sheet blank during the drilling operations.

The carriage is driven through a first screw transmission of the so called ball recirculating type 14 controlled via a first transducer 15 of the type usually employed for detecting angular positions and actuated by means of an acutator 16 carried on the frame.

Each gripper assembly has a gripping head 17 formed by first and second jaws 18 and 19, respectively, which are separately connected to respective fluid dynamic actuators and adapted to grip the edge of the sheet blank 3.

The second jaw is movable, as the carriage is being moved forward with a blank held in the gripper assembly, within annular grooves 20 formed in the roller shroud.

The positional detent means comprises, on the drilling station side, a pad element 21, such as in the form of a movable rod relatively to the frame in a substantially vertical direction to the direction of advance A of the blank being fed to the cited station; preferably, the pad element is formed from a soft material to avoid chipping the sheet edge as the same is caused to bear on it under the urge from the rollers. It is driven vertically by a fluid dynamic actuator 22 associated with the frame and adapted to feed the pad element into a position of interference with the sheet blank as the same is being moved forward and simultaneously encouraged to slide against the abutment by the rollers, to be then retracted into a position of non-interference with the feed-in surface as the blank, gripped in the gripper assemblies, is moved on toward the drilling station.

The drilling station essentially includes a frame 30, preferably independent of the frame of the station 1, on which supporting and locating means for the drill units, respectively designated with the reference numerals 31a and 31b, are mounted; the drill unit 31a essentially comprises an upper drilling head 32 facing a lower drilling head 33 in aligned relationship therewith, while the drill unit 31b preferably comprises a pair of upper drilling heads 34 in the same conditions of alignment and superimposition on a pair of lower drilling heads 35.

This configuration enables each drill unit to be provided with tool bits having different size and functional characteristics, thereby allowing differently configured holes to be made through the sheet blank 3 without manual intervention to replace the tool bits.

The upper drilling heads 32 and 34 are associated with an upper grooved bar 36 in sliding and kinematic engagement therewith; furthermore, the head 32 and pair of heads 34 respectively engage with second and third screw transmissions of the so called ball recirculating type indicated at 38 and 39, respectively; provided on the frame for like functions are a lower grooved bar 40 and third and fourth screw transmissions of the so called ball recirculating type 41 and 42, respectively, engaging with the drilling head 33 and head pair 35.

The cited screw transmission means and grooved bars form drill unit supporting and locating means, and respectively overlie and underlie a working zone of said units at a position corresponding to an extension of the sheet blank feeding surface, thereby each drill unit is adapted to interact with the sheet blank at said working zone.

The screw transmissions of the so called ball recirculating type 38 and 41 cooperate, through a kinematic drive 43, with a first motor 44 provided for translating and positioning the drill unit 31a; likewise, the remaining cited screw transmissions 39 and 42 are kinematically connected to a second motor 45 acting, through a second kinematic drive 46, on those same screw transmissions.

Also provided for each drill unit, on at least one of the cited screw transmissions, is an angular detector 48 of the type specified above, adapted to detect the position of the carriage 11 on the runways 12a and 12b.

The grooved bars 36 and 40 cooperate, in turn, with first and second step motors 49 and 50, respectively, which by turning their respective bars drive the drilling heads upwards and downwards along with their tool bits 51 relatively to the working zone.

In the exemplary embodiment shown in FIG. 4, which concerns the head pair 35 but also holds on somewhat similar principles for both the upper head pair and single drilling heads, the grooved bar 40 is arranged to cooperate, through a kinematic drive 52, with racks 53 provided on each drilling head and generally indicated at 54 and 55, respectively, such that, with the head 54 raised by the drive from the bar 40, the corresponding head 55 is lowered from the working zone.

In a known manner, each drilling head cooperates with a pressure member 56 mounted slidably on a corresponding head and being driven, through the action of fluid dynamic actuators 57', into engagement with the sheet blank during the drilling operation in order to prevent imposing bending or vibrational stresses thereon as due to the action of the tool bits 51.

Each drilling head is hydraulically connected, via a rotary distributor 57, to a cooling fluid supply, not shown, which fluid is delivered through the drilling head to the tool bit for cooling and removing the chips produced thereby.

This device, usually incorporated to conventional machines, involves a whole series of problems which are obviated by the invention by associating with each pressure member a discharge conduit 58 coopearting with a trough 59 adapted to convey the cooling fluid and glass chips admixed to it toward a dumping area remote from the working zone.

In fact, the pressure member, by engaging the sheet blank through a ring nut 60, avoids spilling the cooling fluid and picks it up to convey it to the discharge conduit 58.

In consideration of the drilling technique used to drill through fragile sheet-like materials, the lower heads have also a puller chest indicated at 61 associated therewith and cooperating with a collecting chest 62.

The chest 61 can be snap moved by means of a fluid dynamic cylinder 63 acting in a substantially orthogonal direction to the boring axis, and is moved from a first position whereat a collecting hole 64 thereof underlies the corresponding upper drilling head to a second position, whereat its discharge hole 65 is brought into alignment with the chest 62.

Located at the working zone, the feed-in station preferably comprises a plurality of idle rollers 66 having their axes arranged substantially parallel to those of said rollers and being adapted to avoid leaving an excessively long section of the sheet blank unsupported.

An additional roller 67 is provided downstream of the drilling heads in the sheet blank feeding direction and has similar features to said idle rollers.

A further advantageous feature of the machine of this invention is that a glass sheet can also be processed along its edge gripped in the members 17; these are, in fact, so sized and disposed as to be able to move into the working zone to set up the sheet.

This particular processing method requires the availability of some holding means, generally indicated herein at 70, associated with the frame 30. Such holding means comprises preferably a cylinder actuator 71 carried on the frame with the intermediary of brackets 72 and being provided, on the sheet blank side thereof, with a pressure element 73 extending crosswise to the sheet blank direction of movement and cooperating with discharge rollers 74 which are carried on a supporting framework 75 and possibly driven positively off a drive arrangement 76.

The inventive machine described hereinabove operates as follows.

A sheet blank to be processed is fed to the station 1 in the direction of the arrow A. On the sheet blank contacting the rollers, the kinematic drive acting on the latter causes, by driving said rollers, the sheet blank to move forward, this forward movement combining itself, through the ridges provided on the shroud of each roller, with a translatory movement thereof toward the abutment 10.

This enables the sheet blank to be aligned and brought into an abutment or constant "zero" position irrespective of the sheet blank size.

Said zero position is specially useful where the machine is associated with an NC control because it provides a fixed reference relatively to which the traverse coordinates for the drilling heads can be programmed.

By the rotational effect of the rollers, the sheet blank is moved forward to bear on the pad 21 which, together with the abutment detent, is a part of the positional detent means.

In that condition, the rollers are brought to a stop, and the carriage 11 moves forward to take the gripper head to engage with the trailing edge of the sheet blank.

The carriage is moved forward by the rotary action of the screw transmission of the so called ball recirculating type 14, which action would be controlled through the first transducer 15.

On reaching the sheet blank, the jaw 18 and 19 will grip it and the pad 21 be retracted to a position of noninterference with the sheet blank feeding surface.

According to the programmed drilling site coordinates, the drill units will be positioned preparatory to drilling through the sheet blank.

Simultaneously, the carriage has been moved forward by a sufficient distance to permit twodimensional centering of a hole to be drilled.

On reaching the desired location, the pressure members of the drill unit selected are brought to engage the sheet blank such that the corresponding ring nuts will adhere on opposed surfaces thereof; thereafter, the lower head will drill through the sheet blank to a depth equal to one half its dimensional thickness and be withdrawn as soon as the desired depth is reached. This depth would be programmed through the step motors 49 and 50 according to the selected head.

On completion of this portion of the hole, which would be generally drilled by means of ring cutters with diamond cutting edges, the corresponding upper head is engaged with the sheet blank and cut off, by milling along an annulus through the remaining depth, the small cylindrical off cut, or carrot is dropped into the chest 61.

On completion of the above step, the chest will be withdrawn with a snap movement to cause the carrot to drop into the chest 62, from which it may later be removed on the occasion of some maintenance and/or cleaning operations.

It should be further noted that the coolant is not spread all over the sheet blank to result in an inconvenient working area for the operator, but is collected within the pressure member and directed, through the discharge 58, into the collecting pan 59, thus preventing, inter alia, water and glass chips from falling onto the underlying drilling heads and onto the positioning and supporting means to damage them and deteriorate the head positioning accuracy.

Some special processing techniques may be involved, for example, in the manufacture of door panels, and in particular, holes may have to be drilled at the gripping areas of the jaws 18 and 19, or in the extreme, crescent-like holes may have to be formed along the handgrip edge of such panels. This could not be done with conventional machines owing to the hold on the sheet blank being thus destroyed which ensures its retention in position during the drilling operation; with the machine of this invention, the problem is obviated through the holding means 70 acting, again under the cited NC control, to clamp the sheet blank between the rollers 74 and element 73, thus permitting the carriage to be withdrawn into a condition of noninterference with the drill units.

The invention as disclosed is susceptible to many modifications and changes without departing from the purview of the instant inventive concept, and all of the details may be replaced with other, technically equivalent elements.

In practicing the invention, any suitable materials, dimensions and contingent shapes, may be used to meet individual requirements and conform with the state of the art.

I claim:

1. A machine for drilling fragile sheet-like materials, in particular sheet glass or the like, comprising a feedin station for a sheet blank, a sheet blank drilling station and a drilled sheet discharge station arranged downstream to each other, in aligned relationship and defining an advance direction of said sheet, said feed-in station including a frame, means for locating said sheet in a fixedly predetermined reference zero position, a carriage for advancing said sheet to said drilling station as well as means for controllably driving said carriage to a variable, automatically adjustable position in said drilling station, said locating means comprising a plurality of at least partially driven rollers defining a support surface for said sheet, a motor unit for said rollers, an abutment member carried on said frame laterally to said feed-in station and substantially parallel to said advance direction as well as a transverse reference element interfering with said sheet in the advance movement thereof, said roller having peripherally a shroud having ridges of high frictional coefficient with a helical pattern formed thereon for causing said sheet to move forward in said advance direction toward said transverse reference element and transversely toward said abutment member, said carriage comprising gripper assemblies having jaws for gripping said sheet at edge portions thereof and carrying said sheet from said reference zero position to said variable, automatically adjustable drilling position, said drilling station comprising a drilling station frame, at least one drilling head pair overlaying and underlying a working zone, means for driving said at least one drilling head pair transverse to said sheet advance direction, means for raising and lowering said at least one drilling head pair to and from said sheet, cooling means as well as waste discharge means cooperating with said at least one drilling head pair.

2. A machine according to claim 1, wherein said rollers present an annular groove on said shroud.

3. A machine according to claim 1, wherein said transverse reference element comprises a pad element arranged in the advance path of said blank sheet and movable from a position of interference with said sheet above said sheet support surface to a non-interference position underlying said sheet support surface.

4. A machine according to claim 1, wherein said means for controllably driving said carriage comprises runways supported by and extending laterally to said feed-in station frame and a bearing screw transmission of the ball recirculating type controlled by an angular position transducer.

5. A machine according to claim 1, comprising fluid dynamic actuators connected to said gripper jaws for the aon thereof.

6. A machine according to claim 1, wherein each drilling head of said at least one pair comprises a substantially cylindrical pressure member slidably mounted on said drilling head and accommodating therein a repective independently driven tool bit, said pressure member being hydraulically connected to a cooling fluid supply and a discharge conduit cooperating with a trough for directing the cooling fluid away from said working zone.

7. A machine according to claim 1, comprising a puller chest arranged within a lower drilling head of said at least one pair and a collecting chest mounted on said drilling station frame at a lower level with respect to said puller chest for collecting therein any removed material.

8. A machine according to claim 1, wherein said means for driving said at least one pair comprises grooved bars associated with said drilling station frame and driven by step motors.

9. A machine according to claim 1, further comprising holding means arranged in said drilled sheet discharge station, said holding means including a cylinder actuator with a pressure element cooperating with discharge rollers simultaneously defining a further support surface for said sheet and a discharge conveyor.

10. A machine for drilling fragile sheet-like materials, in particular sheet glass or the like, comprising a feedin station for a sheet blank, a sheet blank drilling station, a drilled sheet discharge station arranged downstream to each other in aligned relationship and defining an advance direction of said sheet, said feed-in station including a frame, means for locating said sheet in a fixedly predeterminated reference zero position, a carriage for advancing said sheet to said drilling station as well as means for controllably driving said carriage to a variable, automatically adjustable position in said drilling station, said locating means comprising a plurality of at least partially driven rollers defining a support surface for said sheet, a motor unit for said rollers, an abutment member carried on said frame laterally to said feed-in station and substantially parallel to said advance direction as well as a pad element located in the advance path of said blank sheet and movable from a position of interference with said sheet above said sheet support surface to a position underlying said sheet support surface, said rollers having peripherally a shroud having ridges of high frictional coefficient with a helical pattern formed thereon for causing said sheet to move forward in said advance direction toward said pad element and transversely toward said abutment member, said carriage comprising gripper assemblies having fluid dynamic actuated jaws for gripping said sheet at edge portions thereof, said means for controllably driving said carriage comprising runways supported by and extending laterally to said feed-in station frame and a hearing screw transmission controlled by an angular transducer for carrying said sheet from said reference zero position to said variable, automatically adjustable drilling position, said drilling station including a drilling station frame, at least one drilling head pair overlying and underlying a working zone, means for driving said at least one drilling head pair transverse to said sheet advance direction, means for raising and lowering said at least one drilling head pair to and from said sheet, cooling means as well as waste discharge means cooperating with said at least one drilling head pair, each drilling head of said at least one pair comprising a substantially cylindrical pressure member slidably mounted on said drilling head and accommodating therein a respective independently driven tool bit, said pressure member being hydraulically connnected to a cooling fluid supply and a discharge conduit cooperating with a trough for directing the cooling fluid away from said working zone.

* * * * *